Dec. 10, 1963 G. B. FREEMAN 3,113,564
LAPIDARY TURNING PROCESS AND APPARATUS
Filed Nov. 14, 1960
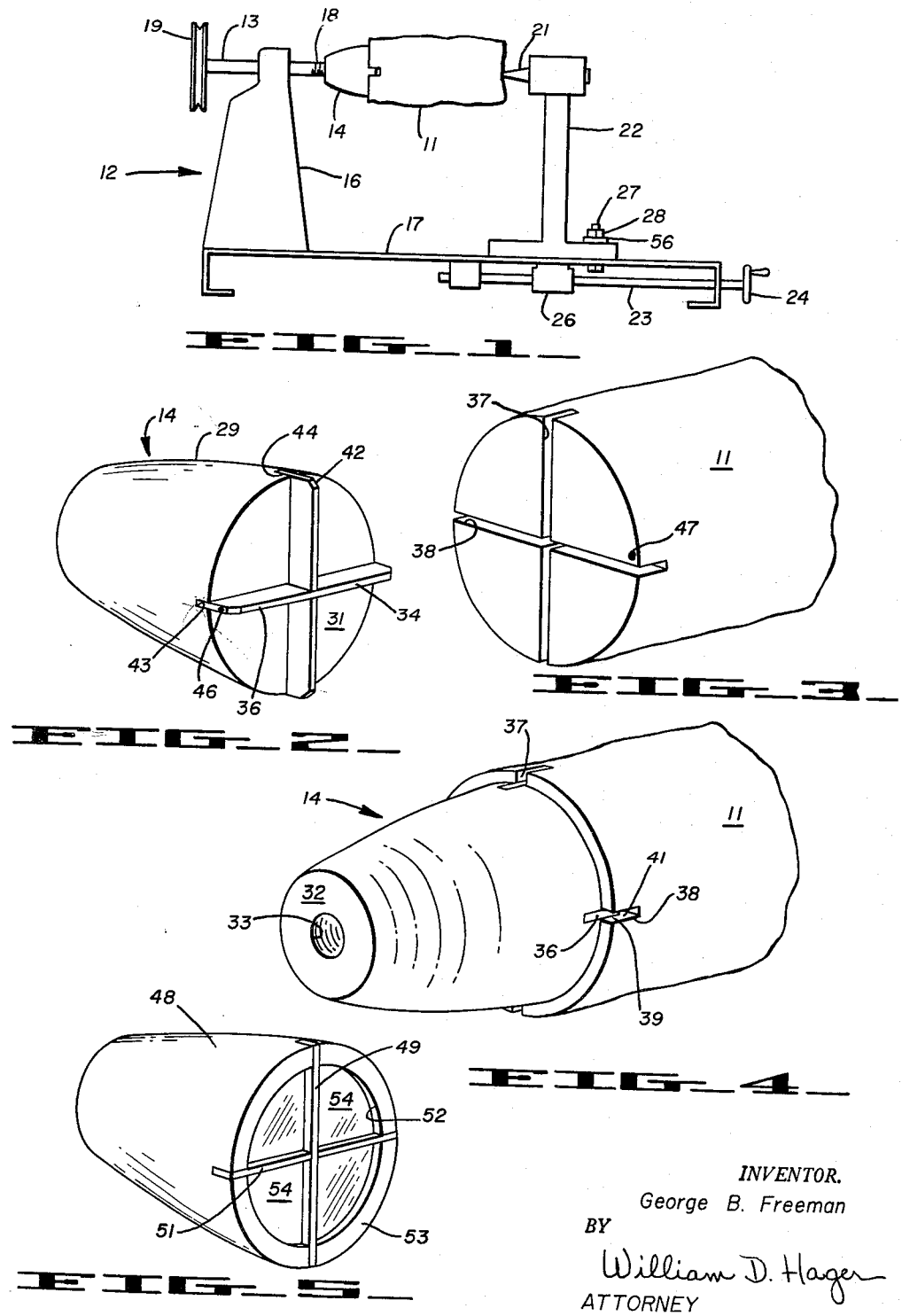
INVENTOR.
George B. Freeman
BY
William D. Hager
ATTORNEY

United States Patent Office 3,113,564
Patented Dec. 10, 1963

3,113,564
LAPIDARY TURNING PROCESS AND
APPARATUS
George E. Freeman, 516 Estudillo Ave.,
San Leandro, Calif.
Filed Nov. 14, 1960, Ser. No. 68,857
4 Claims. (Cl. 125—30)

This invention relates to lapidary work in general, and is particularly directed to the formation of various cylindrical objects from precious or semi-precious stone and the like by turning of a lapidary work piece in a manner comparable to that normally conducted on a lathe with less frangible materials.

Heretofore the formation of a wide variety of cylindrical objects such as chessmen, cups, bowls, etc., from precious or semi-precious stone material has been substantially only possible by the laborious handicraft of the skilled lapidary. Although such cylindrical objects can be mass produced from wood, metal, etc., in an automatic or semi-automatic fashion by turning operations conducted with a lathe or the like, their formation in a comparable manner from stone has been precluded because of its high frangibility. More specifically, previous attempts to turn stone have been unsuccessful because the forces absorbed by the rapidly turning work piece during normal abrading operations stress the stone beyond its breaking point.

It is therefore an object of the present invention to provide for the turning of precious and semi-precious stone or other lapidary material to form a variety of cylindrical objects therefrom.

Another object of the invention is the provision of a method and means whereby a highly frangible work piece may be rotated at high velocity while being contacted by various cutting or abrading implements without breakage.

An extremely important object of the invention is to provide a novel chuck arrangement for the yieldable connection of a frangible work piece to the spindle of a lathe whereby forces transmitted to the work piece during abrading and other turning operations performed thereon are expended in the yieldable connection rather than being absorbed by the work piece.

It is a further object of the invention to provide a means and method for connecting a work piece to a spindle with provision for limited movement of the work piece in directions toward which forces are transmitted thereto by contact of various shaping implements therewith.

A still further object of the invention is the provision of an extremely simple and economical lathe chuck for facilitating the turning of lapidary work on a lathe.

An even further object of the invention is to provide a lathe chuck of the class described whereby a work piece removed from the chuck may be readily reconnected thereto with its original orientation.

These and other advantages of the invention will be more fully set forth in the following description and claims, considered in connection with the accompanying drawing, of which:

FIGURE 1 is an elevational view of a lathe with a lapidary work piece connected to its spindle by means of a chuck arrangement, in accordance with the invention, to facilitate the performance of various turning operations on the work piece without breakage;

FIGURE 2 is an enlarged perspective view of a chuck in accordance with the invention;

FIGURE 3 is an enlarged perspective view of a work piece as prepared for connection to the chuck;

FIGURE 4 is an enlarged perspective view of the work piece in operable connection with the chuck; and FIGURE 5 is an enlarged perspective view of an alternative embodiment of the chuck.

Briefly stated, the invention provides a method and means for connecting a lapidary work piece to the spindle of a lathe or the like in a limitedly yieldable manner such that the work piece may be turned at high velocity and yet will yield sufficiently during its contact with various abrading or other forming implements, and that the resulting forces imposed upon the work piece are not internally absorbed therein. Instead of being severely stressed beyond its breaking point by absorbing the forces internally, the highly frangible work piece expends the forces externally in being free to yield to them as an integral body. In other words, the present invention facilitates heretofore substantially impossible turning operations with lapidary or other highly frangible materials by yieldable connection of the work piece to a spindle or other rotary member. The lapidary turning method of the present invention hence consists in rotating a work piece about its axis with the piece being limitedly yieldable in a contra direction to its rotation as well as axially. This is most preferably accomplished by forming crossed centrally intersecting grooves in an end of the work piece and engaging the grooves in a loose fit with crossed chuck blades or the like rotated about their point of intersection; the opposite end of the work piece being preferably pivotally supported at the rotational axis for most turning applications. Where the distal end of the work piece relative to the chuck is to be shaped as in the formation of a bowl, the support of this end may be dispensed with. In either case, by virtue of the loose fit between the blades and grooves, reliefs are defined between the surfaces of the blades and the adjacent surfaces of the grooves. When the blades are rotated at high velocity they are centrifugally urged into contact with the proximal side surfaces of the grooves with reference to the direction of rotation. In effect a centrifugal lock is thus provided between the blades and grooves sufficient to maintain the work piece in substantially fixed coaxial relation to the axis of revolution.

With the work piece thus rotated, its surface may be contacted with a forming implement at various locations as required to produce a predetermined cylindrical configuration. As the work piece is thus shaped by rotational contact with the forming implement, any forces arising from the contact with the implement are expended in moving the work piece within the limits of the reliefs afforded by the loose fit between the rotating blades and work piece grooves. In response to the extremely severe tangential components of force exerted in a direction opposing rotation of the work piece, the piece moves limitedly within the width wise reliefs between the blades and grooves in a contra rotation direction. Similarly any of the far more less severe axial components of force, as may arise from the shaping implement being applied at other than a right angle to the work piece surface, are expended in limitedly moving the piece axially within the length wise reliefs between the blades and grooves. In effect, the entire work piece thus tends to continuously assume positions within the limits of the reliefs whereat the externally generated forces are in equilibrium, rather than the forces being balanced by the establishment of internal stresses in the work piece which would break same due to the frangible nature of the lapidary material.

The lapidary turning process will be more fully understood upon reference to the drawing and consideration of the novel chuck arrangement illustrated therein for facilitating rotation of a lapidary work piece in the yieldable manner just described. More specifically, as depicted in FIGURE 1, a lapidary work piece 11 is operatively mounted for rotation upon a lathe 12, a yieldable connection of the work piece to the lathe spindle 13 in accordance with the turning method being facilitated by means of a novel cross-bladed chuck 14. As is conventional, the spindle is journalled for rotation in a head stock 16 which is secured in upright position to one end of the lathe bed 17. In the illustrated embodiment, the inner end of the spindle is threaded as indicated at 18 for attachment of the chuck 14, however it will be appreciated that various alternative connecting means may as well be employed. A pulley 19 is secured to the outer end of the spindle to facilitate spindle rotation by belt connection to a motor (not shown) in the usual manner.

In order to rotatably support the work piece 11 at the opposite end thereof from the chuck, either a live center 21 or a dead center is provided carried by a tail stock 22 which is translatable axially of the bed 17. Translation of the tail stock may be facilitated, for example, by means of lead screw 23 journalled at the underside of the bed and rotatable by a hand crank 24. The lead screw is arranged to threadably engage a tapped bore provided in a guide portion 26 of the tail stock that depends through an axially extending slot in the bed. By turning the hand crank 24, the tail stock may thus be translated axially of the bed to a position wherein the live center 21 engages the end of the work piece 11. To lock the tail stock in such position, suitable releasable fastening means are provided such as a bolt 27 extending upwardly through the slot and the base of the stock into engagement with a nut 28.

It will be appreciated that the foregoing arrangement of elements is generally basic as to conventional lathe construction. Although the specific exemplary arrangement is relatively simple in the interest of clarity, the principles of the present invention may of course be as well incorporated in lathes of considerably more complex construction.

Considering now the cross-bladed chuck 14 of the present invention as to preferred construction and referring particularly to FIGURE 2, it is to be noted that the chuck includes a cylindrical body 29 which is preferably tapered. The larger face 31 is employed as the working face of the chuck whereas the smaller diameter face 32 is arranged for connection to a lathe spindle. In the particular case of the lathe 12 where the inner end of the spindle 13 is threaded, the face 32 is hence provided with a tapped axial bore 33 for threadably engaging the spindle threads 18.

In order that the chuck 14 facilitate yieldable connection of the work piece 11 in accordance with the method detailed hereinbefore, the chuck body 29 is provided with crossed blades 34, 36 which project normally from the working face 31 and intersect at its center. Crossed grooves 37, 38 may then be cut, as by means of a diamond saw, or otherwise formed in an end of the work piece (see FIGURE 3) and engaged in a loose fit by the chuck blades 34, 36 (see FIGURE 4) to provide the requisite yieldable connection. More specifically, the blades are of uniform thickness and are square faced as are the grooves formed in the work piece. The width of the grooves, however, exceeds the thickness of the blades by an amount sufficient to produce a loose fit. For example, where the chuck blades are 0.032 inch thick, the grooves are of the order of 0.040 inch wide whereby in the event the blades are centered in the grooves, 0.004 inch reliefs 39 are provided between the opposite side walls of the blades and adjacent side walls of the grooves. Similarly, the depth of the grooves is made to exceed the projection height of the blades from the working face by an amount sufficient to provide end reliefs 41 between the blades and bases of the grooves when the work piece is held in the lathe between the chuck and center 21.

Although the rotary blades 34, 36 may be variously provided and arranged at the working face 31 of the chuck body, it is preferable that the blades be right-angularly intersecting. In addition, the opposite ends of the respective blades are advantageously bevelled from their intersections with the peripheral surface of the chuck body as indicated at 42. The blades are most simply joined by the provision of separate blade members embedded in crossed slots 43, 44 in the working face 31, although various alternatives are possible and will be apparent. Finally, an indexing dot 46 or other indicia is preferably provided adjacent the end of one of the blades. An indexing mark 47 may then be applied to the end of the work piece adjacent the end of one of the grooves and the work piece oriented such that the marked groove end corresponds to the marked blade end in the engagement of the grooves by the blades. By virtue of the indexing dot and corresponding mark on the work piece, the work piece may hence be removed from the chuck and subsequently replaced thereon with its original orientation.

Although the end reliefs 41 between the chuck blades and bases of the work piece grooves facilitate an axially yieldable connection which is suitable for most lapidary turning applications, in some instances such as in the turning of extremely hard materials, e.g., synthetic ruby, a greater amount of axial yieldability is desirable. To this end, the chuck 14 may be modified in the manner indicated in FIGURE 5. As illustrated therein, a cylindrically tapered chuck body 48 is provided which in basic respects is is similar to the chuck body 29 and has crossed blades 49, 51 projecting normally from its working face. It is important to note, however, that the working face includes a circular recess 52 bounded by an annular rim 53 and the blades project from the base of the recess to terminate flush with the face of the rim. In addition, the base of the recess is covered with sectors 54 or quadrants of cushioning material, such as neoprene, cemented or otherwise secured to the base in the regions between the blades. By virtue of this arrangement, the grooved end of a work piece engaged by the chuck blades 49, 51 is in abutment with the cushioning material which, while retaining the axial position of the piece, effectively absorbs axial components of force applied thereto.

In some instances it may be desirable that a lapidary work piece turned for example on the lathe 12 be somewhat yieldably connected to the tail stock center as well as the chuck. Although such additional yieldability in the support of the work piece is by no means a necessity, slightly better results are obtained through its employment, particularly where extremely hard materials are turned. As a desirable adjunct of the invention, therefore, means are provided to render the mounting of the tail stock upon the lathe bed resilient. In the lathe 12, the foregoing is facilitated by the provision of a resilient washer 56, of rubber or the like, interposed between the base of tail stock 22 and the nut 28.

There is thus provided by the present invention a novel method and means by which a lapidary work piece may be mounted in a lathe or the like such that various turning operations may be performed on the work piece without breakage. Many intricate cylindrical objects such as chessmen, ornate bowls, lamp stands, and the like may thereby be formed from lapidary material with relatively higher precision and in but a minor fraction of the time formerly involved in their formation by hand.

Various embodiments of the present invention, in addition to what has been illustrated and described in detail, may be employed without departing from the scope of the accompanying claims.

What is claimed is:

1. A lapidary turning process comprising forming crossed grooves in an end of a lapidary work piece, engaging the grooves in a loose fit with crossed rigid blade members rotatable about their point of intersection whereby reliefs are defined between the blade members and walls of the grooves, rotating the blade members about their point of intersection to thereby rotate said work piece, and contacting the rotating work piece with a forming implement to thereby form a cylindrical object, said work piece moving as a body within the limits of said reliefs to externally expend forces arising from contact between the work piece and forming implement.

2. Apparatus for turning a frangible work piece in a non-destructive manner during contact with an abrading implement, which work piece has at least one substantially radially directed groove formed in an end thereof, comprising spindle means rotatable about an axis of revolution, and chuck means coaxially secured to said spindle means and having at least one projecting blade for insertion into said groove of said work piece, said projecting blade having a thickness which provides for a loose fit in said groove thereby allowing the work piece a limited yieldability in a contra rotational direction relative to that of the spindle, said blade of said chuck being the sole means which applies driving torque to the work piece.

3. A chuck for securing a lapidary work piece to a lathe spindle which work piece has crossed grooves formed in the end thereof which intersect at the axis of rotation of the work piece, said chuck comprising a cylindrical chuck body adapted for coaxial connection to a spindle and having crossed centrally intersecting blades projecting normally from its distal end face relative to the spindle for loose fitting engagement with said crossed grooves in said end of the work piece, said blades having a thickness substantially less than that of said grooves.

4. A lathe for turning a lapidary work piece comprising a bed, a head stock secured at one end of the bed, a spindle journalled in said head stock for rotation about a longitudinal axis parallel to the bed, said spindle adapted for connection to a rotary power drive, a chuck coaxially secured to said spindle and having crossed centrally intersecting blades projecting from its distal face relative to said spindle, said blades being square faced and of uniform thickness, a tail stock resiliently mounted upon said bed for selective translation longitudinally toward and away from said chuck, and a rotary center carried by said tail stock in axial alignment with said chuck.

References Cited in the file of this patent
UNITED STATES PATENTS

| | | |
|---|---|---|
| 134,498 | Vom Hofe | Dec. 31, 1872 |
| 485,410 | Gill | Nov. 1, 1892 |
| 900,761 | McKim | Oct. 13, 1908 |
| 962,274 | Van Epps | June 21, 1910 |
| 2,116,135 | Bath | May 3, 1938 |
| 2,317,319 | West | Apr. 20, 1943 |
| 2,784,534 | Townsend | Mar. 12, 1957 |

FOREIGN PATENTS

| | | |
|---|---|---|
| 722,496 | Great Britain | Jan. 26, 1955 |